United States Patent
Kim et al.

(10) Patent No.: US 7,720,156 B2
(45) Date of Patent: May 18, 2010

(54) RESIDUE IMAGE DOWN/UP SAMPLING METHOD AND APPARATUS AND IMAGE ENCODING/DECODING METHOD AND APPARATUS USING RESIDUE SAMPLING

(75) Inventors: Woo-shik Kim, Gyeonggi-do (KR); Hyun-Mun Kim, Gyeonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 1541 days.

(21) Appl. No.: 11/020,223

(22) Filed: Dec. 27, 2004

(65) Prior Publication Data

US 2005/0141617 A1 Jun. 30, 2005

Related U.S. Application Data

(60) Provisional application No. 60/551,778, filed on Mar. 11, 2004.

(30) Foreign Application Priority Data

Dec. 27, 2003 (KR) ............ 10-2003-0098237
Dec. 16, 2004 (KR) ............ 10-2004-0107158

(51) Int. Cl.
*H04N 7/12* (2006.01)
(52) U.S. Cl. ............ 375/240.21; 375/240; 375/240.01; 375/240.25
(58) Field of Classification Search ............ 375/240, 375/240.01, 240.12, 240.16, 240.18, 240.21, 375/240.25; 382/236
See application file for complete search history.

(56) References Cited

U.S. PATENT DOCUMENTS 5,974,184 A * 10/1999 Eifrig et al. ............ 382/236
6,104,434 A * 8/2000 Nakagawa et al. ...... 375/240.16

(Continued)

FOREIGN PATENT DOCUMENTS

KR 0171747 10/1998

(Continued)

OTHER PUBLICATIONS

European Search Report for EP 04 25 8101, dated May 31, 2006.

(Continued)

*Primary Examiner*—Allen Wong

(57) ABSTRACT

A residue image down- and/or up-sampling method and apparatus and an image encoding and/or decoding method and apparatus using the residue image down- and/or up-sampling method and apparatus are provided. The residue image downsampling method includes: generating a residue corresponding to the difference between an original image and a predicted image, for each image component of the original image formed with at least two or more image components; and downsampling the residue for each image component at a predetermined ratio. The residue image upsampling method includes: upsampling data downsampled from residue data of an original image; and restoring the original image by adding the predicted image to the upsampled residue of each component. According to the methods and apparatuses, a residue image is obtained by performing spatiotemporal prediction encoding first, and by sampling this residue image, loss of information occurring in the sampling process can be reduced. Since sampling is performed with a residue image obtained through a spatiotemporal prediction process, even when an original image that is not color transformed is directly encoded, sampling can be performed effectively. Also, the methods and apparatuses have an advantage that in addition to colors, sampling of any components can be performed effectively.

20 Claims, 16 Drawing Sheets

U.S. PATENT DOCUMENTS 6,108,383 A  8/2000  Miller et al.
6,222,884 B1 * 4/2001  Mitchell et al. ........ 375/240.18

FOREIGN PATENT DOCUMENTS

WO  98/00980 A  1/1998
WO  99/55013 A  10/1999

OTHER PUBLICATIONS

Recommendation H.263: Video coding for low bit rate communication ITU-T Draft Recommendation H.263, Feb. 1998, pp. 1-167. XP002176560, p. 4, paragraph 3.4.9; p. 9—p. 13, paragraph 4.2, p. 23—p. 27, paragraphs 5.1.3,5.1.4, p. 85—p. 88, paragraph K.1,K.2, pp. 129-142, paragraph Q.1—paragraph Q.7.2, figure 3/H.263, figure Q.1/H.263.

Plompen R: "Motion video coding for visual telephony", 1990, Motion Video Coding for Visual Telephony. Proefschrift, Leidschendam, PTT Research Neher Lab, NL, pp. 39-43, XP002369764, p. 40, line 9—p. 41, line 2, figure 2.12.

Kobayashi M et al., "Lossless compression for RGB color still images" Image Processing, 1999, ICIP 99. Proceedings, 1999 International Conference of Kobe, Japan Oct. 24-28, 1999, Piscataway, NJ, USA, IEEE, US, vol. 4, Oct. 24, 1999, pp. 73-77, XP010368688, ISBN: 0-7803-5467-2, p. 74—p. 75, paragraph 2.

European Search Report dated Mar. 17, 2006.

Wiegand T: "Text of Final Committee Draft of Joint Video Specification (ITU-T Rec. H.264 / ISO/IEC 14496-10 AVC) MPEG02/N4920", ISO/IEC JTC1/SC29/WG11 MPEG02/N4920, pp. I-XV, 1, XP001100641, Jul. 2002, p. 67—p. 72, paragraph 8.5, Figure 8-11.

* cited by examiner

FIG. 1A (PRIOR ART)

× REPRESENT LUMINANCE SAMPLES
○ REPRESENT CHROMINANCE SAMPLES

FIG. 1B (PRIOR ART)

× REPRESENT LUMINANCE SAMPLES
○ REPRESENT CHROMINANCE SAMPLES

FIG. 1C (PRIOR ART)

× REPRESENT LUMINANCE SAMPLES

○ REPRESENT CHROMINANCE SAMPLES

FIG. 12
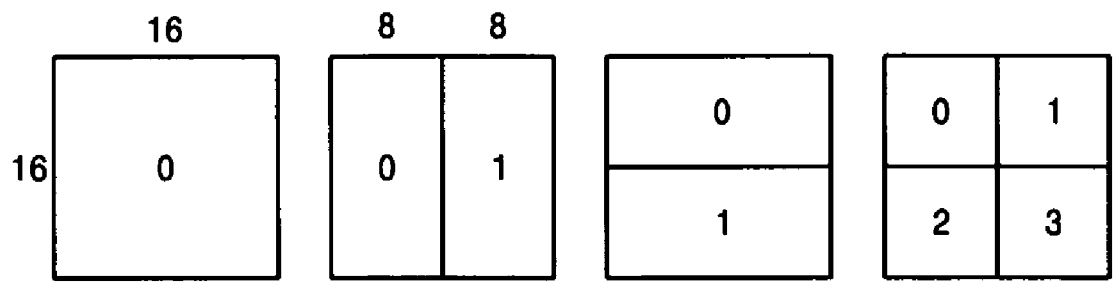
MACRO BLOCK PARTITIONS : 16x16, 16x8, 8x16, 8x8
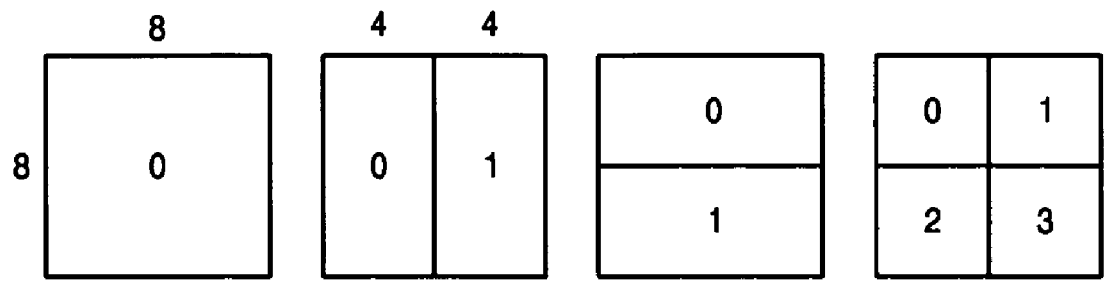
MACRO BLOCK PARTITIONS : 8x8, 8x4, 4x4

RESIDUE IMAGE DOWN/UP SAMPLING METHOD AND APPARATUS AND IMAGE ENCODING/DECODING METHOD AND APPARATUS USING RESIDUE SAMPLING

Priority is claimed to Korean Patent Application No. 10-2003-0098237, filed on Dec. 27, 2003, and No. 10-2004-0107158, filed on Dec. 16, 2004, in the Korean Intellectual Property Office, and U.S. Provisional Patent Application No. 60/551,778, filled on Mar. 11, 2004, in the U.S. Patent and Trademark Office, the disclosures of which are incorporated herein in their entirety by reference.

BACKGROUND OF THE INVENTION

1. Field of the Invention

The present invention relates to image encoding and/or decoding, and more particularly, to a residue image down- and/or up-sampling method and apparatus and an image encoding and/or decoding method and apparatus using the residue image down- and/or up-sampling method and apparatus.

2. Description of the Related Art

Generally, when a color image is encoded, color transform is first performed and then encoding is performed. That is, when a color image is encoded, the image is divided into a luminance component and a chrominance component and then encoding is performed. At this time, more information is concentrated on the luminance component, and the chrominance component has less information. Accordingly, in order to increase compression efficiency, the number of samples of the chrominance component is reduced and then encoded. At this time, as the sampling format, a 4:2:2 format and a 4:2:0 format are generally used. That is, in the conventional encoding method, an original image is divided into a luminance component and a chrominance component, then the chrominance component is sampled, and then, encoding is performed.

For example, in order to encode an RGB image, the RGB image is transformed into a YCbCr image, a luminance component and a chrominance component are separated, and then, encoding is performed. If thus encoding is performed, the encoding efficiency is enhanced, because there is much redundancy between respective chrominance components and the redundancy has been removed through the transform.

Meanwhile, during a transform and restoration process, loss occurs such that the picture quality of the image can be degraded. The thus transformed image goes through a chrominance sampling process in order to increase a compression efficiency. The reason for this process is, because information is concentrated on the luminance component through the color transform, the amount of information in the chrominance component is less, and because human vision is less sensitive to a color change, even when color information is reduced, it cannot be easily discerned through human vision. FIGS. 1B and 1C illustrate chrominance sampling methods with a 4:2:2 format and a 4:2:0 format, respectively, in YCbCr that is generally used. In FIGS. 1A through 1C, X represents a luminance Y component, while O represents chrominance components Cb and Cr. Here, O is represented by Cb and Cr components overlapping each other. That is, one O mark corresponds to a pair of Cb and Cr components. FIG. 1A shows a 4:4:4 format that is a state before sampling. FIG. 1B shows a 4:2:2 format and it can be seen that the chrominance component is reduced by half compared to the luminance component. At this time, it can be seen that two chrominance samples adjacent in the width direction are combined into one. The reason for combining samples in the width direction is that the redundancy in the width direction is generally greater than that in the length direction, and is also to easily support display in interlaced scanning. In FIG. 1C, 4 samples adjacent in the width and length directions are combined into one such that the chrominance component is reduced to one fourth of the luminance component. In order to sample a chrominance component, only immediately adjacent pixels can be considered, but in general, filtering is performed considering values of surrounding pixels together.

Meanwhile, when the thus transformed image is encoded, a process removing redundancy in each component through spatiotemporal prediction is performed and as a result, a residue image is obtained. In H.264/MPEG-4 pt. 10 AVC Standardization technology of Joint Video Team (JVT) of ISO/IEC MPEG and ITU-T VCEG ("Text of ISO/IEC FDIS 14496-10: Information Technology—Coding of audio-visual objects—Part 10: Advanced Video Coding", ISO/IEC JTC 1/SC 29/WG 11, N5555, March, 2003), encoding efficiency is enhanced by performing spatial and temporal prediction encoding in a variety of ways.

FIG. 2 is a block diagram showing a general image encoding process. As described above, the color of an original image (In) is transformed by changing the color representation format through the color transform unit 200. Chrominance downsampling is performed in a chrominance downsampling unit 210, and then encoding process is performed through a spatiotemporal prediction unit 220, a transform/quantization unit 230, an entropy encoding unit 240, an inverse quantization/inverse transform unit 250, and a spatiotemporal prediction compensation unit 260.

FIG. 3 is a block diagram showing a general image decoding process. As described above, also when decoding is performed, a bitstream is entropy decoded in an entropy decoding unit 300, and inverse quantization and inverse transform are performed in an inverse quantization/inverse transform unit 310, and by doing so, decoding is performed. Then, the decoded image (F'n) undergoes chrominance upsampling and inverse color transform in a chrominance upsampling unit 330 and an inverse color transform unit 340 such that a restored image (I'n) is generated.

Among problems occurring in this sampling process, two can be pointed out in particular. One problem is that because sampling is performed immediately after color transform is performed, loss of information is great.

The other problem is that when color transform is not performed, the effect of sampling is reduced greatly. This is because information is redundantly present in each component before color transform is performed and if sampling is performed directly, loss occurs in each component to increase the total loss. Accordingly, generally, sampling is not performed directly but performed after color transform is performed. Also, the luminance component is not sampled and only the chrominance component is sampled and used.

SUMMARY OF THE INVENTION

The present invention provides a residue image down- and/or up-sampling apparatus and method by which a residue image generated through prediction encoding is sampled.

The present invention also provides an image encoding and/or decoding apparatus and method using residue sampling, in which a residue image generated through prediction encoding during data is encoded is sampled.

The present invention also provides a down- and/or up-sampling method of an RGB color image.

According to an aspect of the present invention, there is provided a residue image downsampling method including: generating a residue corresponding to the difference between an original image and a predicted image, for each image component of the original image formed with at least two or more image components; and downsampling the residue for each image component at a predetermined ratio.

The generating of the residue may include: in case of intra mode, obtaining a predicted image for each component of the original image by estimating a prediction direction from a pixel spatially close to the pixel block of a current frame of each image component, and in case of inter mode, obtaining a predicted image by estimating a motion in units of blocks with a predetermined size between a current frame of each image component and the previous frame; and obtaining a residue by subtracting the predicted image from the original image. The original image may be one of an R-G-B format image, a Y-Cb-Cr format image, and an X-Y-Z format image.

The method may further include before the generating of the residue: performing color transform of the original image formed with at least two or more image components, wherein in the generating of the residue, for each component of the color transformed image, a residue corresponding to the difference between the color transformed image and a predicted image is generated.

The method may further include: transforming the generated residue by using the relation between residues of respective image components, wherein in the downsampling of the residue, the transformed residue for each image component is downsampled at a predetermined ratio.

According to another aspect of the present invention, there is provided a residue image downsampling apparatus including: a spatiotemporal prediction unit generating a residue corresponding to the difference between an original image and a predicted image, for each image component of the original image formed with at least two or more image components; and a downsampling unit downsampling the residue for each image component at a predetermined ratio.

In case of intra mode, the spatiotemporal prediction unit may obtain a predicted image for each component of the original image by estimating a prediction direction from a pixel spatially close to the pixel block of a current frame of each image component, and in case of inter mode, may obtain a predicted image by estimating a motion in units of blocks with a predetermined size between a current frame of each image component and the previous frame, and generate a residue by obtaining the difference of the predicted image from the original image. The original image may be one of an R-G-B format image, a Y-Cb-Cr format image, and an X-Y-Z format image.

The apparatus may further include: a color transform unit performing color transform of the original image expressed in a predetermined color image format into another format color image expression, wherein for each component of the color transformed image, the spatiotemporal prediction unit generates a residue corresponding to the difference between the color transformed image and a predicted image.

The apparatus may further include: a residue transform unit transforming the residue by using the relation between residues of respective image components, in relation to the residue generated in the spatiotemporal prediction unit, wherein the downsampling unit downsamples the transformed residue of each image component at a predetermined ratio.

According to still another aspect of the present invention, there is provided a residue image upsampling method including: when in an original image formed with at least two or more image components, the difference between the original image and a predicted image is referred to as a residue, upsampling and downsampled data of the residue data; and restoring the original image by adding the predicted image to the upsampled residue of each component.

The upsampling may be performed in units of image data blocks with a predetermined size and for pixels on the left-hand side boundary and top boundary of a current block, upsampling may be performed by using pixel values of the current block. The original image may be one of an R-G-B format image, a Y-Cb-Cr format image, and an X-Y-Z format image.

In case of intra mode, the predicted image for each component of the original image may be obtained by estimating a prediction direction from a pixel spatially close to the pixel block of a current frame of each image component, and in case of inter mode, the predicted image may be obtained by estimating a motion in units of blocks with a predetermined size between a current frame of each image component and the previous frame.

The upsampling of data may further include: performing inverse residue transforming of the upsampled data; and in the restoring of the original image, the original image is restored by adding the predicted image to the inverse residue transformed residue of each component.

The restoring of the original image may further include: if the original image is transformed into a predetermined color image expression format when it is downsampled, inverse transforming the original image into a predetermined different color image expression format.

According to yet still another aspect of the present invention, there is provided a residue image upsampling apparatus including: an upsampling unit upsampling downsampled data of residue data when in an original image formed with at least two or more image components, the difference between the original image and a predicted image is referred to as a residue; and a spatiotemporal prediction compensation unit restoring the original image by adding the predicted image to the upsampled residue of each component. The original image may be one of an R-G-B format image, a Y-Cb—Cr format image, and an X-Y-Z format image.

In case of intra mode, the spatiotemporal prediction compensation unit may obtain a predicted image for each component of the original image by estimating a prediction direction from a pixel spatially close to the pixel block of a current frame of each image component, and in case of inter mode, may obtain a predicted image by estimating a motion in units of blocks with a predetermined size between a current frame of each image component and the previous frame, and restore an original image by adding the predicted image to the upsampled residue of each component.

The upsampling of the upsampling unit may be performed in units of image data blocks with a predetermined size and for pixels on the left-hand side boundary and top boundary of a current block, upsampling may be performed by using pixel values of the current block.

The upsampling unit may further include: an inverse residue transform unit performing inverse residue transforming of the upsampled data; and the spatiotemporal prediction compensation unit restores the original image by adding the predicted image to the inverse residue transformed residue of each component.

The spatiotemporal prediction compensation unit may further include: an inverse color transform unit performing inverse color transform of the original image into a predetermined different color image expression format.

According to a further aspect of the present invention, there is provided an image encoding method using residue sampling including: generating a residue corresponding to the difference between an original image and a predicted image, for each image component of the original image formed with at least two or more image components; downsampling the residue for each image component at a predetermined ratio; and generating a bitstream by encoding the downsampled data.

The generating of the residue may include: in case of intra mode, obtaining a predicted image for each component of the original image by estimating a prediction direction from a pixel spatially close to the pixel block of a current frame of each image component, and obtaining a spatial residue by subtracting the predicted image from the original image; and in case of inter mode, obtaining a predicted image for each component of the original image by estimating a motion in units of blocks with a predetermined size between a current frame of each image component and the previous frame, and obtaining a temporal residue by subtracting the predicted image from the original image. The original image may be one of an R-G-B format image, a Y-Cb—Cr format image, and an X-Y-Z format image.

The method may further include before the generating of the residue: performing color transform of the original image formed with at least two or more image components, into a different color image expression format, wherein in the generating of the residue, for each component of the color transformed image, a residue corresponding to the difference between the color transformed image and a predicted image is generated.

The method may further include: transforming the generated residue by using the relation between residues of respective image components, wherein in the downsampling of the residue, the transformed residue for each image component is downsampled at a predetermined ratio.

The generating of the bitstream may include: transforming and quantizing the downsampled data; and generating a bitstream by entropy encoding the quantized data.

The generation of the predicted image may include: performing inverse quantization and inverse transform the signal generated through the transform and quantization; upsampling the inverse transformed data; and generating a restored image by performing prediction compensation of the upsampled data.

According to an additional aspect of the present invention, there is provided an image encoding method using residue sampling including: in an original image formed with at least two or more image components, for each of the image components, generating a residue corresponding to the difference of an original image and a predicted image in units with a predetermined size; determining whether or not to perform sampling of the generated residue, by using predetermined information indicating whether or not to perform sampling; if it is determined to perform sampling, downsampling the residue image at a predetermined ratio; and if sampling is performed, encoding the downsampled data, and if sampling is not performed, encoding residue data to generate a bitstream.

Information indicating whether or not to perform sampling of a residue may be selectively set with respect to the size unit of image data.

The information indicating whether or not to perform sampling of a residue may be set in units of sequences of an image desired to be encoded and in units of macroblocks in the sequence.

According to an additional aspect of the present invention, there is provided an image encoding apparatus using residue sampling including: a residue generation unit generating a residue corresponding to the difference between an original image and a predicted image, for each image component of the original image formed with at least two or more image components; a downsampling unit downsampling the residue for each image component at a predetermined ratio; and an encoding unit generating a bitstream by encoding the downsampled data.

The residue generation unit may include: a spatial residue generation unit obtaining a predicted image for each component of the original image in case of intra mode, by estimating a prediction direction from a pixel spatially close to the pixel block of a current frame of each image component, and obtaining a spatial residue by subtracting the predicted image from the original image; and a temporal residue generation unit obtaining a predicted image for each component of the original image in case of inter mode, by estimating a motion in units of blocks with a predetermined size between a current frame of each image component and the previous frame, and obtaining a temporal residue by subtracting the predicted image from the original image. The original image may be one of an R-G-B format image, a Y-Cb—Cr format image, and an X-Y-Z format image.

The apparatus may further include: a color transform unit performing color transform of the original image formed with at least two or more image components, into a different color image expression format, wherein for each component of the color transformed image, the residue generation unit generates a residue corresponding to the difference between the color transformed image and a predicted image.

The apparatus may further include: a residue transform unit transforming the residue generated in the residue generation unit, by using the relation between residues of respective image components, wherein the downsampling unit downsamples the transformed residue for each image component at a predetermined ratio.

The encoding unit may include: a transform/quantization unit transforming and quantizing the downsampled data; and an entropy encoding unit generating a bitstream by entropy encoding the quantized data.

The apparatus may further include: a predicted image generation unit generating a predicted image input to the residue generation unit, wherein the prediction image generation unit may include: an inverse quantization/inverse transform unit performing inverse quantization and inverse transform of a signal generated through the transform and quantization; an upsampling unit upsampling the inverse transformed data; and a spatiotemporal prediction compensation unit generating a restored image by performing prediction compensation of the upsampled data.

According to an additional aspect of the present invention, there is provided an image encoding apparatus using residue sampling including: a spatiotemporal prediction unit generating a residue for each of the image components in units with a predetermined size from the original image formed with at least two or more image components, the residue corresponding to the difference of an original image and a predicted image; a sampling determination unit determining whether or not to perform sampling, with respect to the predetermined size unit of image data; a downsampling unit downsampling the generated residue image at a predetermined ratio if the sampling determination unit determines to perform sampling; and an encoding unit encoding the downsampled data, if sampling is performed, and if sampling is not performed, encoding residue data to generate a bitstream.

According to an additional aspect of the present invention, there is provided an image decoding method using residue sampling including: when in an original image formed with at least two or more image components, the difference between the original image and a predicted image is referred to as a residue, generating downsampled data of residue data by performing at least entropy decoding from a bitstream; upsampling downsampled data of the residue data; and restoring the original image by adding the predicted image to the upsampled residue of each component.

The generating of downsampled data of residue data may include: when in the original image formed with at least two or more image components, the difference between the original image and a predicted image is referred to as a residue, performing entropy decoding from a bitstream; and generating downsampled data of the residue data, by performing inverse quantization and inverse transform of the entropy encoded data. The original image may be one of an R-G-B format image, a Y-Cb—Cr format image, and an X-Y-Z format image.

In case of intra mode, the predicted image for each component of the original image may be obtained by estimating a prediction direction from a pixel spatially close to the pixel block of a current frame of each image component, and in case of inter mode, the predicted image may be obtained by estimating a motion in units of blocks with a predetermined size between a current frame of each image component and the previous frame.

The upsampling of data may be performed in units of image data blocks with a predetermined size and for pixels on the left-hand side boundary and top boundary of a current block, the upsampling may be performed by using pixel values of the current block.

The upsampling of data may further include: performing inverse residue transforming of the upsampled data; and in the restoring of the original image, the original image is restored by adding the predicted image to the inverse residue transformed residue of each component.

The restoring of the original image may further include: if the original image is transformed into a predetermined color image expression format when it is downsampled, inverse transforming the original image into a predetermined different color image expression format.

According to an additional aspect of the present invention, there is provided an image decoding method using residue sampling including: restoring data by performing at least entropy decoding from a bitstream when in an original image formed with at least two or more image components, the difference between the original image and a predicted image is referred to as a residue; determining whether or not the restored data is downsampled data; if the data is downsampled residue data, performing upsampling; and restoring the original image by adding a predicted image to the restored data if it is determined that the data is not downsampled data, and by adding the predicted image to the upsampled residue of each component if it is determined that the data is downsampled data.

The restoring the original image may include: if it is interpreted that the data is not downsampled data, performing inverse residue transform of the data restored in the data restoration unit, and if it is interpreted that the data is downsampled data, performing inverse residue transform of the upsampled data; and restoring the original image by adding the predicted image to the inverse residue transformed data.

According to an additional aspect of the present invention, there is provided an image decoding apparatus using residue sampling including: a data restoration unit generating downsampled data of residue data when in an original image formed with at least two or more image components, the difference between the original image and a predicted image is referred to as a residue; an upsampling unit upsampling downsampled data of the residue data; and a spatiotemporal prediction compensation unit restoring the original image by adding the predicted image to the upsampled residue of each component.

The data restoration unit may include: an entropy decoding unit performing entropy decoding from a bitstream when in an original image formed with at least two or more image components, the difference between the original image and a predicted image is referred to as a residue; and an inverse quantization/inverse transform unit generating downsampled data of residue data, by performing inverse quantization and inverse transform of the entropy decoded data. The original image may be one of an R-G-B format image, a Y-Cb-Cr format image, and an X-Y-Z format image.

In case of intra mode, the predicted image for each component of the original image may be obtained by estimating a prediction direction from a pixel spatially close to the pixel block of a current frame of each image component, and in case of inter mode, the predicted image may be obtained by estimating a motion in units of blocks with a predetermined size between a current frame of each image component and the previous frame.

The upsampling of the upsampling unit may be performed in units of image data blocks with a predetermined size and for pixels on the left-hand side boundary and top boundary of a current block, upsampling may be performed by using pixel values of the current block.

The apparatus may further including: an inverse residue transform unit performing inverse residue transform of the upsampled data, wherein the spatiotemporal prediction compensation unit restores the original image by adding the predicted image to the inverse residue transformed residue of each component.

The apparatus may further include: an inverse color transform unit performing inverse color transform of the image restored in the spatiotemporal prediction compensation unit into a predetermined different color image expression format if the original image is transformed into a predetermined color image expression format when it is downsampled.

According to an additional aspect of the present invention, there is provided an image decoding apparatus using residue sampling including: a data restoration unit performing at least entropy decoding from a bitstream when in an original image formed with at least two or more image components, the difference between the original image and a predicted image is referred to as a residue; a sampling information interpretation unit interpreting whether or not data restored in the data restoration unit is downsampled data; an upsampling unit performing upsampling of downsampled data of the residue data; and a spatiotemporal prediction compensation unit restoring the original image by adding a predicted image to the data restored in the data restoration unit if the sampling information interpretation unit interprets that the data is not downsampled data, and by adding the predicted image to the upsampled residue of each component if the sampling information interpretation unit interprets that the data is downsampled data.

The apparatus may further include: an inverse residue transform unit performing inverse residue transform of the data restored in the data restoration unit, if the sampling information interpretation unit interprets that the data is not downsampled data, and if the sampling information interpretation interprets that the data is downsampled data, performing inverse residue transform of the upsampled data, wherein the spatiotemporal prediction compensation unit restores the original image by adding the predicted image to the inverse residue transformed data.

According to an additional aspect of the present invention, there is provided a downsampling method of an RGB color image including: examining visual importance of each component of an RGB color image; and downsampling each component of the RGB color image at a predetermined ratio on the basis of the visual importance. The downsampling ratio of each component of the RGB color image may be 4:2:2 or 2:2:1.

According to an additional aspect of the present invention, there is provided an upsampling method of an RGB color image including: dividing a downsampled RGB color image into R, G, and B components; and upsampling each component of the downsampled RGB color image at a ratio corresponding to the downsampling.

According to an additional aspect of the present invention, there is provided a computer readable medium having embodied thereon a computer program for any of the methods.

BRIEF DESCRIPTION OF THE DRAWINGS

The above and other features and advantages of the present invention will become more apparent by describing in detail exemplary embodiments thereof with reference to the attached drawings in which:

FIG. 1A illustrates a chrominance sampling method in case of a sampling format of 4:4:4;

FIG. 1B illustrates a chrominance sampling method in case of a sampling format of 4:2:2;

FIG. 1C illustrates a chrominance sampling method in case of a sampling format of 4:2:0;

FIG. 12 illustrates a method for dividing macroblocks for temporal prediction;

DETAILED DESCRIPTION OF THE INVENTION

Figure 2:
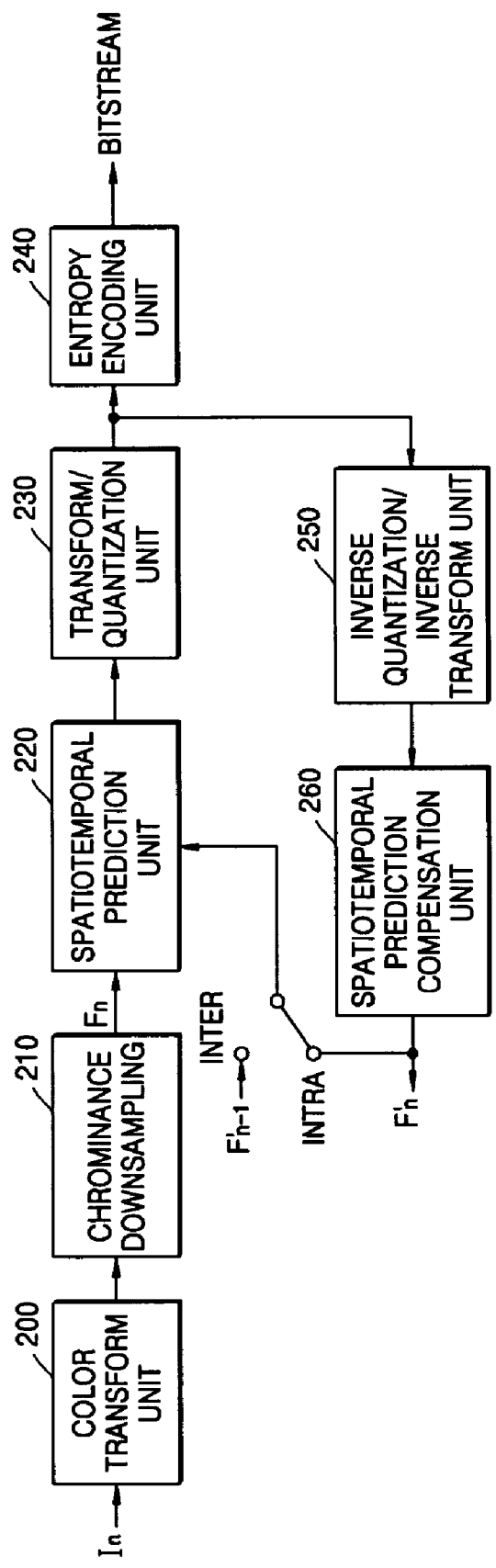
FIG. 2 is a block diagram of an encoding apparatus according to the conventional method.
Figure 3:
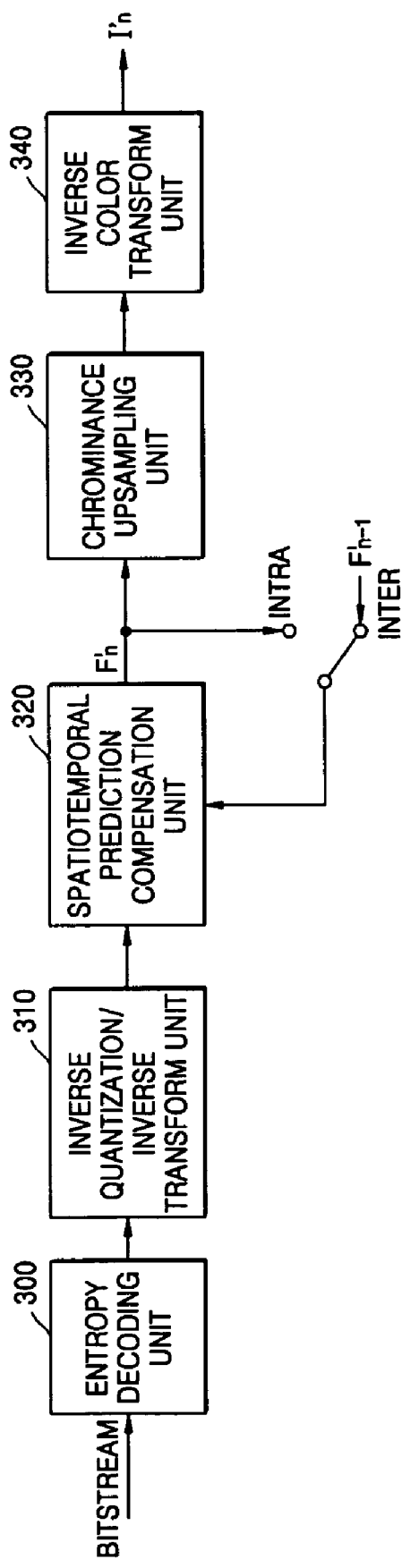
FIG. 3 is a block diagram of a decoding apparatus according to the conventional method.

An RGB image sampling method, a residue image sampling method and apparatus, and an image encoding and/or decoding apparatus and method using the residue image sampling method and apparatus according to the present invention will now be described more fully with reference to the accompanying drawings, in which exemplary embodiments of the invention are shown.

The basic concept of the present invention will now be explained. If spatiotemporal prediction encoding is performed, the data amount of an image desired to encode is greatly reduced. Accordingly, in order to reduce information loss by sampling, when a color transformed image is encoded, sampling is not directly performed, but spatiotemporal prediction encoding is first performed to obtain a residue image.

If the thus obtained residue image is sampled, information loss can be greatly reduced compared to the information loss when sampling is directly performed. An image in which the chrominance component is not sampled as shown in FIG. 1A can be a color transformed image that is an image input in this case. At this time, only the chrominance component can be sampled as in the conventional method, or both the luminance component and the chrominance component can be sampled.

In the conventional method, since information is concentrated on the luminance component, if the luminance component is sampled, the loss will become great and therefore, only the chrominance component is sampled and the luminance component is not sampled. However, in the present invention, since through spatiotemporal prediction encoding, a lot of information is removed also in the luminance component, even when the luminance component is sampled, the loss can be reduced. However, since information is more present in the luminance component than in the chrominance component even in a residue image, the sampling ratios of the luminance component and the chrominance component can be differentiated.

Thus, according to the present invention, since the luminance component and the chrominance component can be effectively sampled, the present invention can be applied even to the images in which chrominance components are already sampled as in FIGS. 1B and 1C.

In this case, since the chrominance component is already sampled, only the residue of the luminance component can be sampled or the chrominance component can be further sampled, or both the luminance and chrominance components can be sampled together.

Also in the present invention, in order to perform sampling even when an original image that is not color transformed is to be encoded directly, sampling is performed with a residue image obtained through a spatiotemporal prediction process.

In this case, since the original image is not color transformed, information in each chrominance component is overlapping. Accordingly, in order to remove this redundant information, residue transform for performing transform encoding between respective components can be performed before sampling in the residue image.

Figure 4:
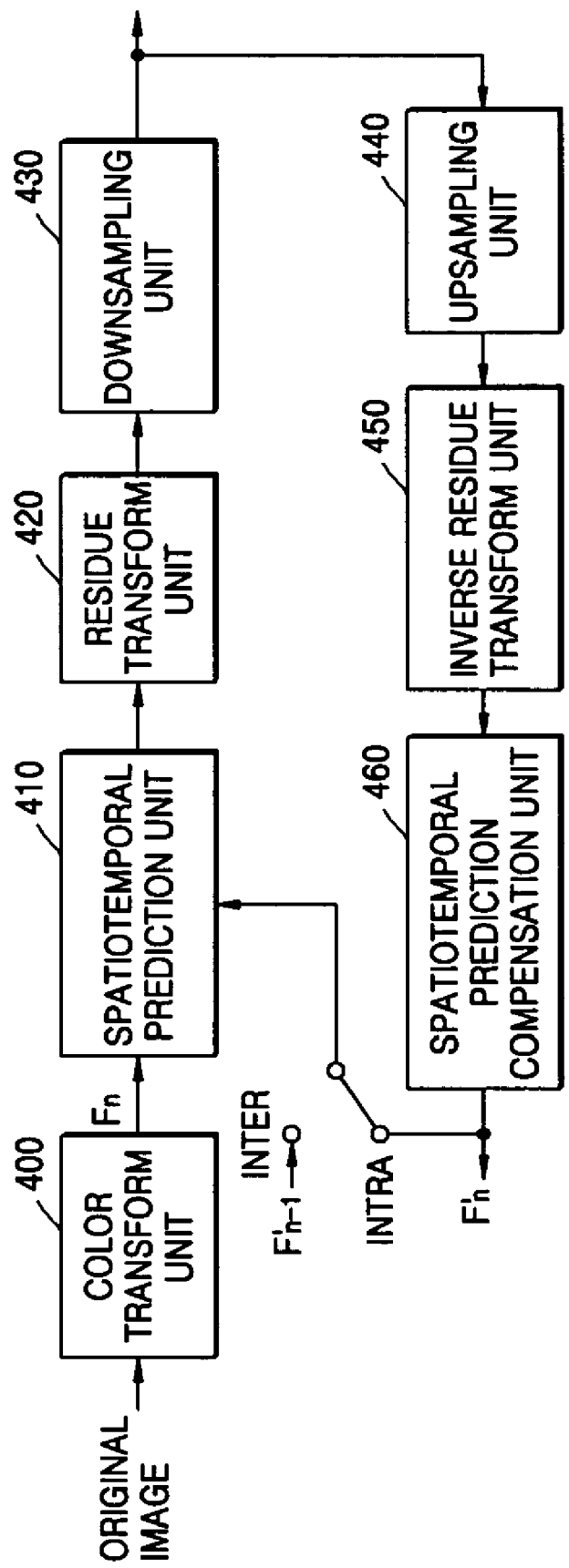
FIG. 4 is a block diagram of a preferred embodiment of the structure of a downsampling apparatus of a residue image according to the present invention.

FIG. 4 is a block diagram of a preferred embodiment of the structure of a downsampling apparatus of a residue image according to the present invention. The downsampling apparatus of a residue image according to the preferred embodiment includes a color transform unit 400, a spatiotemporal prediction unit 410, a residue transform unit 420, a downsampling unit 430, an upsampling unit 440, an inverse residue transform unit 450, and a spatiotemporal prediction compensation unit 460.

The color transform unit 400 transforms an original image expressed in a predetermined color image format into another format color image expression. For example, if the original image is an RGB image, the RGB image can be color transformed into a YCbCr image. Also, in the present invention, a residue can be generated after color transform through the color transform unit 400, or a residue can be generated directly from the original image without going through the color transform unit 400. The residue generation is performed in units with a predetermined size.

The spatiotemporal prediction unit 410 generates a residue image for each image component of an original image when color transform is not performed, or of a color transformed image when color transform is performed, in which the residue image is obtained by the difference between a predicted image and the color transformed image or the original image. The method for obtaining the predicted image is as follows. In case of intra mode, a predicted image for each component of the original image is obtained by estimating a prediction direction from a pixel spatially close to the pixel block of a current frame of each image component. In case of inter mode, a predicted image is obtained by estimating a motion in units of blocks with a predetermined size between a current frame of each image component and the previous frame.

When the image is expressed as a color image signal in an RGB format, the residue image can be expressed as the following equation 1:

$$\Delta R = R - R_p$$
$$\Delta G = G - G_p$$
$$\Delta B = B - B_p \qquad (1)$$

Here, each of R, G, and B indicates the image of a corresponding component of the color image, and $R_p$, $G_p$, and $B_p$ indicate the predicted image of R, G, and B, respectively. The predicted image is used to remove redundant information in each color component, and the signal remaining after the redundant information is removed is referred to as a residue.

The residue transform unit 420 performs residue transform of the residue generated by the spatiotemporal prediction unit 410 according to a predetermined residue transform formula. When necessary, the residue transform unit 420 can be omitted. That is, the residue generated by the spatiotemporal prediction unit 410 can be directly downsampled by the downsampling unit 430.

In the residue transform, assuming that three components of a color image are $X_1$, $X_2$, and $X_3$, and $\Delta X_1$, $\Delta X_2$, and $\Delta X_3$ are residues of $X_1$, $X_2$, and $X_3$, respectively, residue transform can be performed by subtracting the residue value of one component from the residue values of the other two components of the three components as in the following equation 2:

$$\begin{bmatrix} \Delta^2 X_1 \\ \Delta^2 X_2 \\ \Delta^2 X_3 \end{bmatrix} = \begin{bmatrix} 1 & -1 & 0 \\ 0 & 1 & 0 \\ 0 & -1 & 1 \end{bmatrix} \begin{bmatrix} \Delta X_1 \\ \Delta X_2 \\ \Delta X_3 \end{bmatrix} \qquad (2)$$

Here, $\Delta^2 X_1$, $\Delta^2 X_2$, and $\Delta^2 X_3$ are residue transformed signals.

An applied example of the equation 2 will now be explained. When a color image is expressed by an RGB signal, a transform method subtracting $\Delta G$ from $\Delta R$ and $\Delta B$ with using $\Delta G$ as a predictor can be expressed as the following equation 3:

$$\begin{bmatrix} \Delta^2 R \\ \Delta^2 G \\ \Delta^2 B \end{bmatrix} = \begin{bmatrix} 1 & -1 & 0 \\ 0 & 1 & 0 \\ 0 & -1 & 1 \end{bmatrix} \begin{bmatrix} \Delta R \\ \Delta G \\ \Delta B \end{bmatrix} \qquad (3)$$

Here, $\Delta^2 R$, $\Delta^2 G$, and $\Delta^2 B$ are residue transformed signals.

Also, as the residue transform formula, the following equation 4 can also be used:

$$\begin{bmatrix} \Delta^2 X_1 \\ \Delta^2 X_2 \\ \Delta^2 X_3 \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} \Delta X_1 \\ \Delta X_2 \\ \Delta X_3 \end{bmatrix} \qquad (4)$$

Here, $\Delta^2 X_1$, $\Delta^2 X_2$, and $\Delta^2 X_3$ are residue transformed signals.

The equation 4 shows a color transform formula set up considering correlations between respective components in order to more efficiently remove redundancy between respective components. That is, an applied example of the equation 4 is a YCoCg transform formula expressed as the following equation 5:

$$\begin{bmatrix} Y \\ Co \\ Cg \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} R \\ G \\ B \end{bmatrix} \qquad (5)$$

The following equation 6 is obtained by applying the YCoCg transform formula of the equation 5 to residue transform:

$$\begin{bmatrix} \Delta^2 R \\ \Delta^2 G \\ \Delta^2 B \end{bmatrix} = \begin{bmatrix} 1/4 & 1/2 & 1/4 \\ 1/2 & 0 & -1/2 \\ -1/4 & 1/2 & -1/4 \end{bmatrix} \begin{bmatrix} \Delta R \\ \Delta G \\ \Delta B \end{bmatrix} \qquad (6)$$

However, in case of YCoCg transform formula, a rounding error occurs during transform. Accordingly, in order to perform lossless transform, each of the components corresponding to Co and Cg, respectively, among $\Delta R$, $\Delta G$, and $\Delta B$ components, should be multiplied by 4 and then used.

In addition, as the residue transform formula, the following equation 7 can also be used.

$$\Delta^2 X_1 = \Delta X_2 - \Delta X_3 \qquad (7)$$
$$t = \Delta X_3 + (\Delta^2 X_1 \gg 1)$$
$$\Delta^2 X_3 = \Delta X_1 - t$$
$$\Delta^2 X_2 = t + (\Delta^2 X_3 \gg 1)$$

The equation 7 is obtained by generalizing YCoCg-R. YCoCg-R is obtained by improving YCoCg transform by using a lifting method, and is expressed as the following equation 8:

$$Co = R - B \quad (8)$$
$$t = B + (Co \gg 1)$$
$$Cg = G - t$$
$$Y = t + (Cg \gg 1)$$

This transform can also be applied to a residue transform formula in the same manner. In this case, when transform is performed, each of the components corresponding to Co and Cg, respectively, among ΔR, ΔG, and ΔB components, is multiplied by 2 such that lossless transform is enabled without a rounding error.

The downsampling unit 430 downsamples the residue transformed signal if the sampling apparatus has the residue transform unit 420, or downsamples residue data generated in the spatiotemporal prediction unit 410 if the sampling apparatus does not have the residue transform unit 420. When the downsampling is performed, the sampling ratio for each component may vary. For example, in case of an image formed with a luminance component and a chrominance component, the luminance component may not be sampled with sampling only the chrominance component, or the sampling ratio of the luminance component can be made to be higher than that of the chrominance component.

Meanwhile, the upsampling unit 440, the inverse residue transform unit 450 and the spatiotemporal prediction compensation unit 460 are used to generate a predicted image. The upsampling unit 440 upsamples a signal downsampled through the downsampling unit 420, and the inverse residue transform unit 450 performs inverse residue transform of the upsampled data. The spatiotemporal prediction compensation unit 460 generates a restored image (F'n), by performing spatiotemporal prediction compensation of the residue transformed data. The inverse residue transform unit 450 performs inverse residue transform of only the data residue transformed through the residue transform unit 420.

Figure 5:
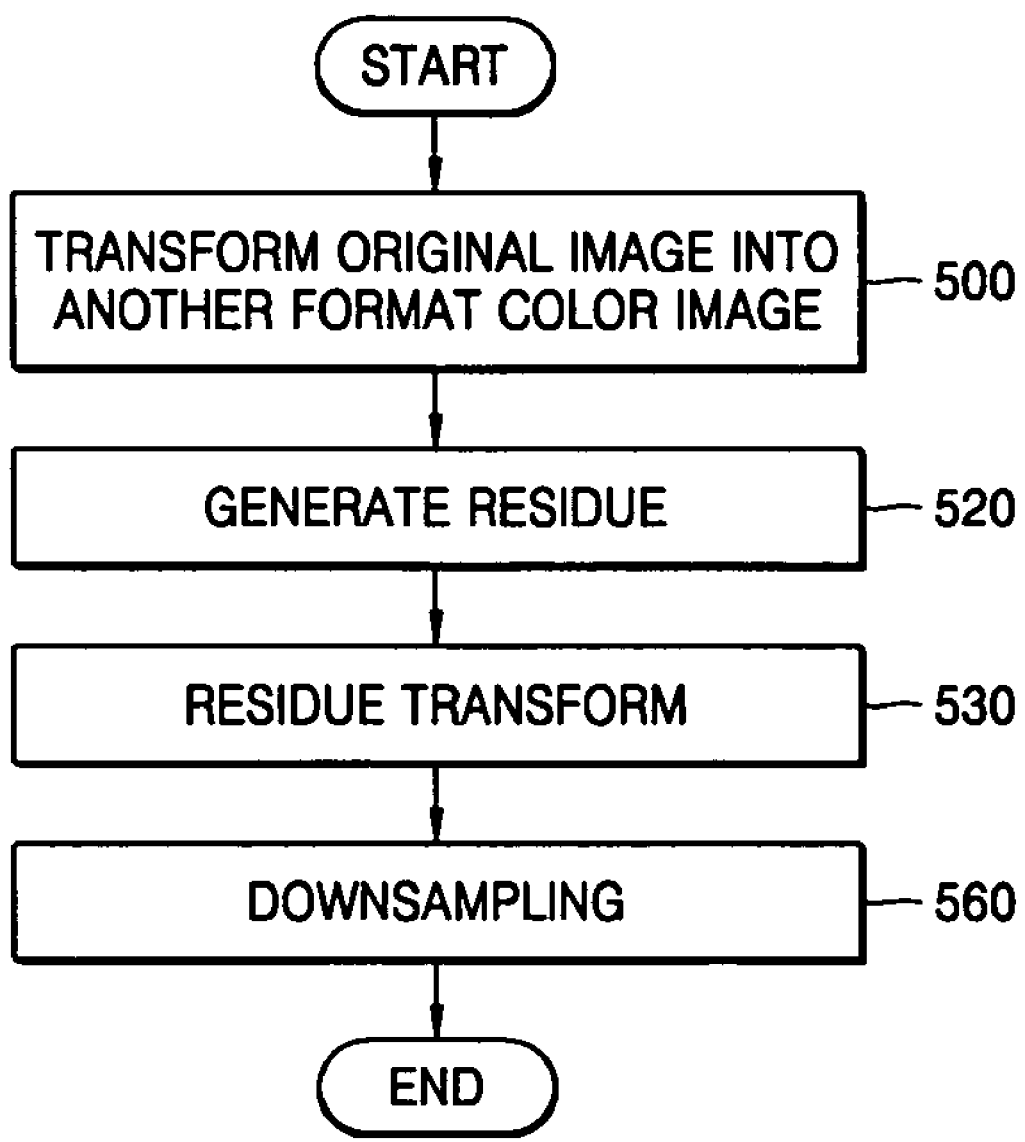
FIG. 5 is a flowchart of the operations performed by a preferred embodiment of a downsampling method of a residue image according to the present invention.

FIG. 5 is a flowchart of the operations performed by a preferred embodiment of a downsampling method of a residue image according to the present invention. Referring to FIGS. 4 and 5, the downsampling method of a residue image and the operations of the downsampling apparatus of a residue image according to an embodiment of the present invention will now be explained.

First, if an original image is input to the color transform unit 400, the image is transformed into a different format color image in operation 500. For example, if the original image is a color image of an RGB signal, it can be transformed into a luminance signal and a chrominance signal in a YCbCr format. The color transformed signal is input to the spatiotemporal prediction unit 410 such that for each image component, a residue image obtained by the difference between a predicted image and the color transformed image or the original image is generated in operation 520. In the present invention, according to necessity, a residue can be generated after color transform is performed by the color transform unit 400, or a residue can be generated directly from the original image without going through the color transform unit 400. Also, the predicted image is generated with the downsampled signal going through the upsampling unit 440, the inverse residue transform unit 450, and the spatiotemporal prediction compensation unit 460 sequentially. That is, the downsampled signal is upsampled by the upsampling unit 440, inverse residue transformed by the inverse residue transform unit 450, and then spatiotemporal prediction compensated by the spatiotemporal prediction compensation unit 460 such that the restored image (F'n) is generated. As a result, the predicted image is obtained as follows. In case of intra mode, the predicted image for each component of the original image is obtained by estimating a prediction direction from a pixel spatially close to the pixel block of a current frame of each image component. In case of inter mode, the predicted image is obtained by estimating a motion in units of blocks with a predetermined size between a current frame of each image component and the previous frame.

The inverse residue transform unit 450 performs inverse residue transform of only the data residue transformed through the residue transform unit 420.

The generated residue image is input to the residue transform unit 420 and according to a predetermined residue transform formula, residue transformed in operation 530. Since the explanation of the residue transform is the same as described in the residue transform unit 420, it will be omitted here.

The residue transformed data is input to the downsampling unit 430 and downsampled in operation 560. Since the residue transform unit 420 can be omitted when appropriate, the residue generated by the spatiotemporal prediction unit 410 can be directly downsampled by the downsampling unit 430.

Figure 6:
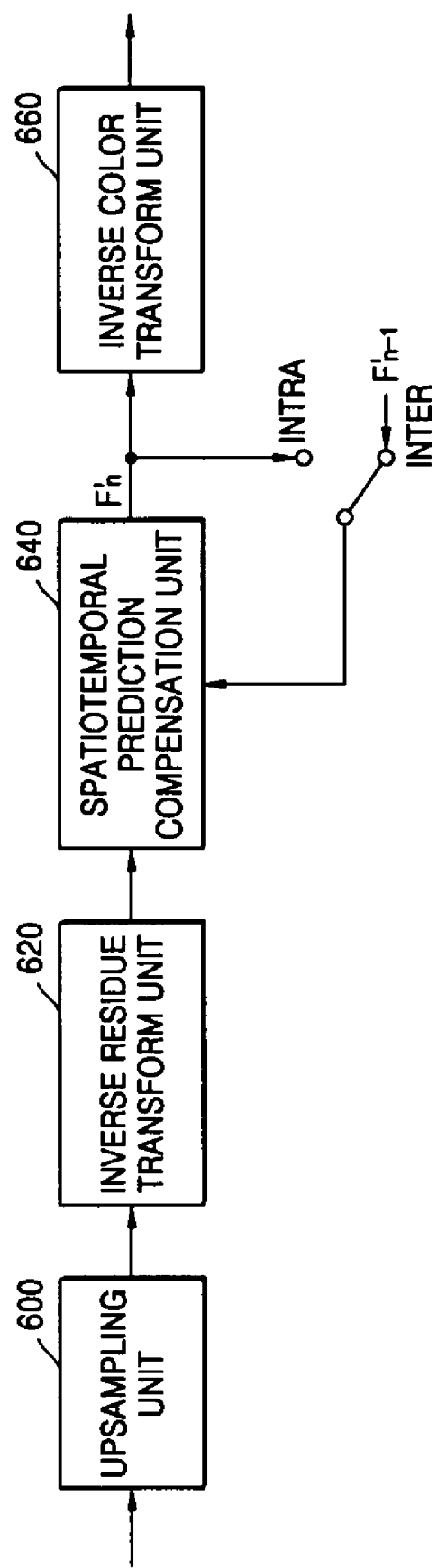
FIG. 6 is a block diagram of a preferred embodiment of the structure of an upsampling apparatus of a residue image according to the present invention.

FIG. 6 is a block diagram of a preferred embodiment of the structure of an upsampling apparatus of a residue image according to the present invention. The upsampling apparatus includes an upsampling unit 600, an inverse residue transform unit 620, a spatiotemporal prediction compensation unit 640, and an inverse color transform unit 660.

The upsampling unit 600 upsamples the downsampled residue data.

The inverse residue transform unit 620 performs inverse residue transform of the upsampled data. The inverse residue transform is the inverse process of the residue transform and uses the inverse transform formula of the residue transform formula, which is used when the residue is transformed. Accordingly, inverse residue transform is performed by using equation 9 as the inverse transform formula if the transform formula equation 2 is used for residue transform, equation 10 as the inverse transform formula if the transform formula equation 4 is used, and equation 11 as the inverse transform formula if the transform formula equation 7 is used.

$$\begin{bmatrix} \Delta X_1 \\ \Delta X_2 \\ \Delta X_3 \end{bmatrix} = \begin{bmatrix} 1 & 1 & 0 \\ 0 & 1 & 0 \\ 0 & 1 & 1 \end{bmatrix} \begin{bmatrix} \Delta^2 X_1 \\ \Delta^2 X_2 \\ \Delta^2 X_3 \end{bmatrix} \quad (9)$$

Here, $\Delta^2 X_1$, $\Delta^2 X_2$, and $\Delta^2 X_3$ are residue transformed signals.

$$\begin{bmatrix} \Delta X_1 \\ \Delta X_2 \\ \Delta X_3 \end{bmatrix} = \begin{bmatrix} 1 & 1 & -1 \\ 1 & 0 & 1 \\ 1 & -1 & -1 \end{bmatrix} \begin{bmatrix} \Delta^2 X_1 \\ \Delta^2 X_2 \\ \Delta^2 X_3 \end{bmatrix} \quad (10)$$

Here, $\Delta^2 X_1$, $\Delta^2 X_2$, and $\Delta^2 X_3$ are residue transformed signals.

$$t = \Delta^2 X_2 - (\Delta^2 X_3 \gg 1)$$

$$\Delta X_1 = \Delta^2 X_3 + t$$

$$\Delta X_3 = t - (\Delta^2 X_1 \gg 1)$$

$$\Delta X_2 = \Delta X_3 + \Delta^2 X_1$$

(11)

Here, $\Delta^2 X_1$, $\Delta^2 X_2$, and $\Delta^2 X_3$ are residue transformed signals.

The spatiotemporal prediction compensation unit 640 restores the original image by adding the predicted image to the residue for each component, the residue inverse residue transformed in the inverse residue transform unit 620. If the downsampled data is not residue transformed, the upsampled data is directly input to the spatiotemporal prediction compensation unit 640 and by adding the predicted image to the residue for each component, the original image is restored.

The original image can be, for example, any one image of an R-G-B format, a Y-Cb-Cr format, and an X-Y-Z format. The spatiotemporal prediction compensation unit 640 will now be explained in more detail.

The spatiotemporal prediction compensation unit 640 obtains a predicted image for each component of the original image in case of intra mode, by estimating a prediction direction from a pixel spatially close to the pixel block of a current frame of each image component, and obtains a predicted image in case of inter mode, by estimating a motion in units of blocks with a predetermined size between a current frame of each image component and the previous frame. Then, by adding the predicted image to the upsampled residue for each component, the spatiotemporal prediction compensation unit 640 restores the original image.

Also, when the original image of the upsampled data has been color transformed to a different color expression format, the inverse color transform unit 660 performs inverse color transform of the color transform so that the original image is restored. For example, if the original image is an RGB image and is color transformed to a YCbCr color expression format before downsampling, the inverse color transform unit 660 performs inverse color transform of the color image in the YCbCr expression format into the color image in the RGB expression format.

Figure 7:
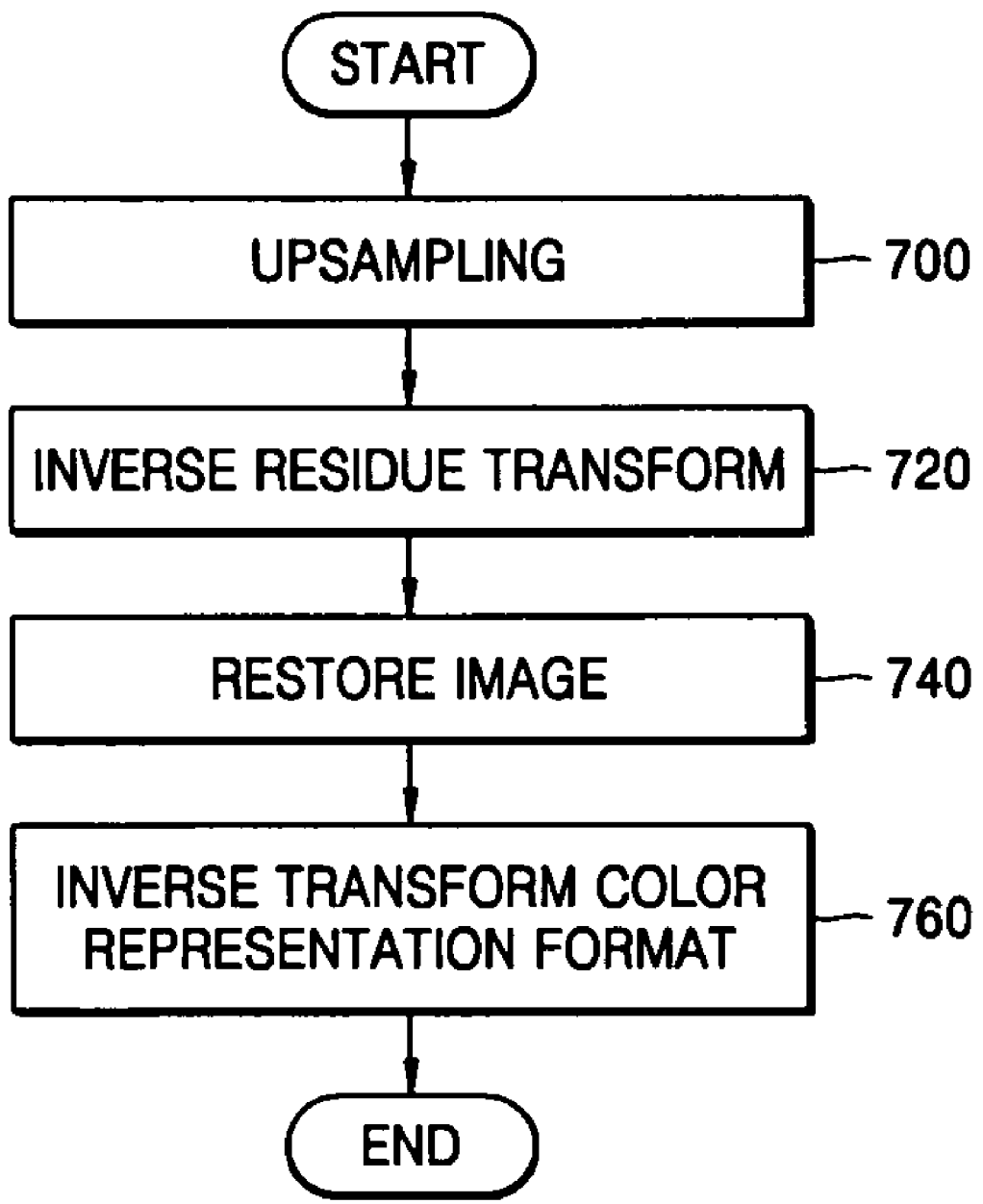
FIG. 7 is a flowchart of the operations performed by a preferred embodiment of an upsampling method of a residue image according to the present invention.

FIG. 7 is a flowchart of the operations performed by a preferred embodiment of an upsampling method of a residue image according to the present invention. Referring to FIGS. 6 and 7, the upsampling method of a residue image and the operations of the apparatus according to the present invention will now be explained.

First, if downsampled image data is input to the upsampling unit 600, upsampling is performed in operation 700. The upsampled data is inverse residue transformed by the inverse residue transform unit 620 in operation 720. Since the explanation of the inverse residue transform is the same as described in the inverse residue transform unit 620, detailed explanation will be omitted.

The inverse residue transformed data is input to the spatiotemporal prediction compensation unit 640 and by adding the predicted image to the reside for each component, the original image is restored in operation 740. More specifically, in case of intra mode, a predicted image for each component of the original image is obtained by estimating a prediction direction from a pixel spatially close to the pixel block of a current frame of each image component, and in case of inter mode, a predicted image is obtained by estimating a motion in units of blocks with a predetermined size between a current frame of each image component and the previous frame. Then, by adding the predicted image to the upsampled residue for each component, the original image is restored.

Meanwhile, if the downsampled image being input to the upsampling unit 600 did not go through a residue transform process before the image was downsampled, the downsampled image is directly input to the spatiotemporal prediction compensation unit 640 without inverse residue transform and by adding the predicted image to the residue for each component, the original image is restored. Also, if the downsampled image being input to the upsampling unit 600 has been color transformed to change the color expression format before the image was downsampled, the image restored in the spatiotemporal prediction compensation unit 640 is input to the inverse color transform unit 660 such that the image is inverse color transformed and the original image is restored in operation 760.

Figure 8:
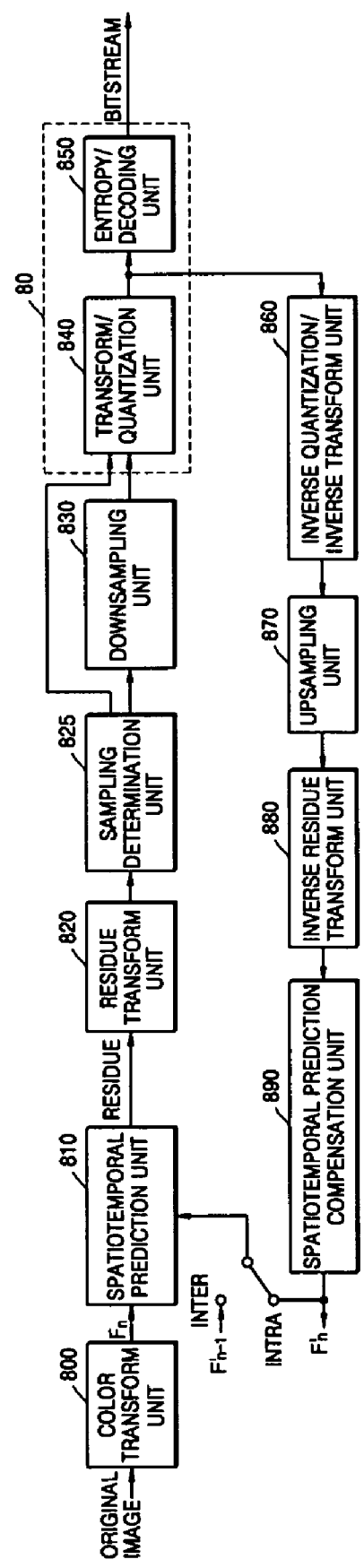
FIG. 8 is a block diagram of a preferred embodiment of an image encoding apparatus using residue downsampling according to the present invention.

Meanwhile, FIG. 8 is a block diagram of a preferred embodiment of an image encoding apparatus using residue downsampling according to the present invention. The image encoding apparatus using residue downsampling includes: a color transform unit 800, a spatiotemporal prediction unit 810, a residue transform unit 820, a downsampling unit 830, a transform/quantization unit 840, an entropy encoding unit 850, an inverse quantization/inverse transform unit 860, an upsampling unit 870, an inverse residue transform unit 880 and a spatiotemporal prediction compensation unit 890. Since the explanations on the color transform unit 800, the spatiotemporal prediction unit 810, the residue transform unit 820, the downsampling unit 830, the upsampling unit 870, the inverse residue transform unit 880, and the spatiotemporal prediction compensation unit 890 are the same as described in the downsampling apparatus of a residue image, the explanations will be omitted.

However, in order to perform downsampling adaptively, a sampling determination unit 825 is further included. The sampling determination unit 825 determines whether or not to perform sampling selectively according to a predetermined size unit of image data. Depending on necessity, the image data size can be any of a variety of sizes, such as a sequence, a frame, a macroblock, and a 4×4 block. For example, information indicating whether or not to perform sampling can be set as one of sequence parameters (residue_sampling_flag), and even in a sequence, it can be set by using a flag (mb_residue_sampling_flag) in units of macroblocks.

If it is determined in the sampling determination unit 825 that the generated residue is to be sampled, the downsampling unit 830 downsamples the residue image at a predetermined ratio. Then, the encoding unit 80 generates a bitstream by encoding the downsampled data when downsampling is performed, or the residue data when sampling is not performed.

Also, though the upsampling unit 440 of FIG. 4 upsamples downsampled data, the upsampling unit 870 of FIG. 8 upsamples inverse quantized and inverse transformed data. The transform/quantization unit 840 and the entropy encoding unit 850 are also referred collectively to as an encoding unit 80.

The transform/quantization unit 840 performs lossy compression of the data downsampled in the downsampling unit 830, through transform (for example, DCT transform) and quantization in units of blocks with a predetermined size. The entropy encoding unit 850 generates a bitstream by entropy encoding the data transformed and quantized in the transform/quantization unit 840. The inverse quantization/inverse transform unit 860 performs inverse transform and inverse quantization of the transformed and quantized data. In case of lossless encoding, the transform/quantization unit 840 is not used. In this case, the inverse quantization/inverse transform 860 is not necessary.

Figure 9:
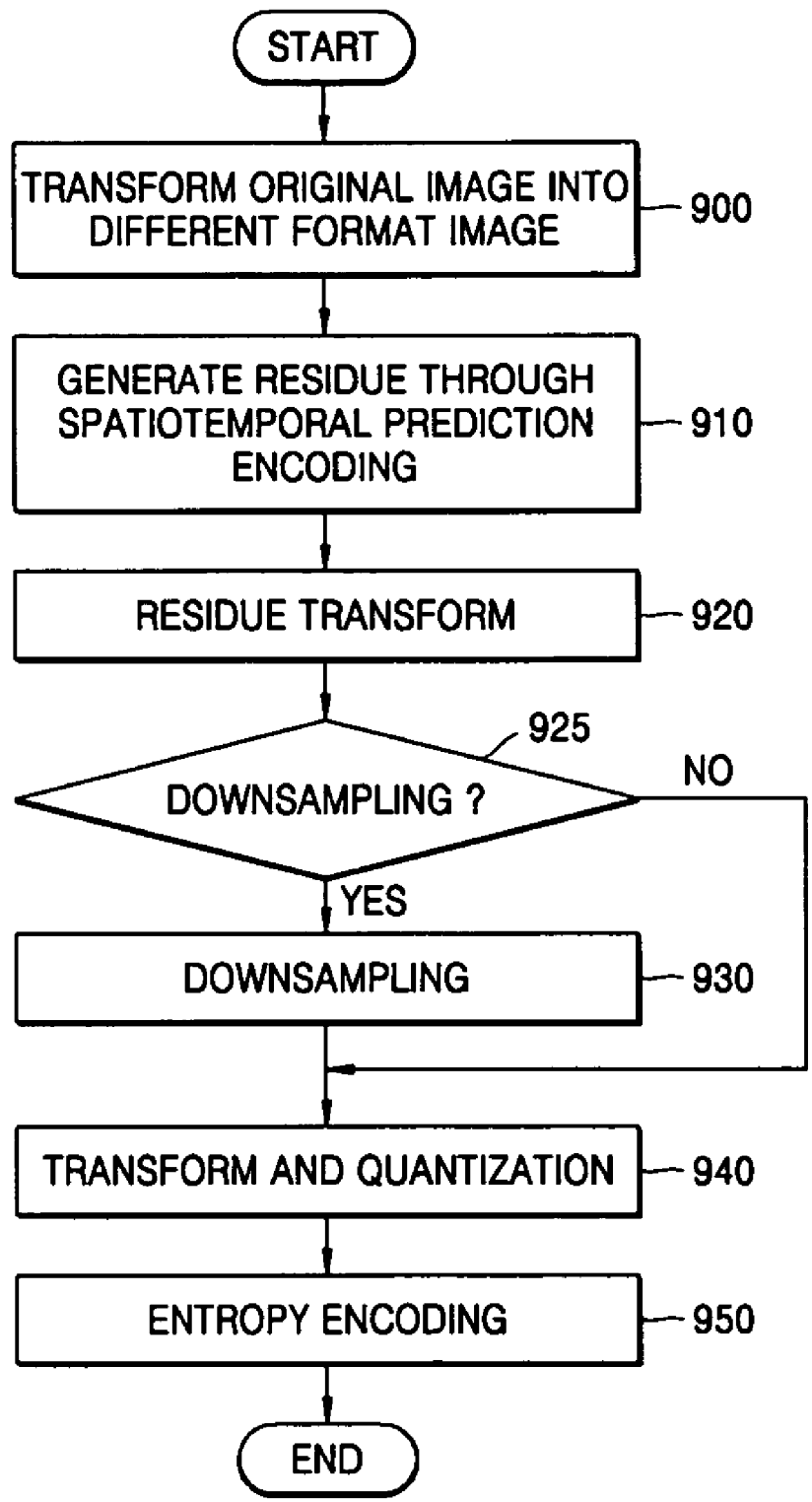
FIG. 9 is a flowchart of the operations performed by a preferred embodiment of an image encoding method using residue downsampling according to the present invention.

FIG. 9 is a flowchart of the operations performed by a preferred embodiment of an image encoding method using residue downsampling according to the present invention. Referring to FIGS. 8 and 9, the image encoding method using residue downsampling and the operation of the apparatus will now be explained.

First, since the operations, including color transforming an original image into another format image in operation 900, performing spatiotemporal prediction encoding in operation 910, generating a residue in operation 920, transforming the residue in operation 930, and performing downsampling 940, are the same as explained above for the downsampling method of a residue image and the operation of the apparatus, further explanation will be omitted.

However, after the residue transform in operation 920, sampling can be performed adaptively. That is, by using predetermined information indicating whether or not to perform residue sampling, it is determined whether or not to perform sampling of the generated residue in operation 925. For example, when information indicating whether or not to perform sampling is represented by a flag, it can be indicated as two types. Information indicating whether or not to perform sampling of a sequence can be expressed as residue_sampling_flag, while information indicating whether or not to perform sampling of a macroblock forming a frame of the sequence can be expressed as mb_residue_sampling_flag. If residue_sampling_flag is set to "0", no mb_residue_sampling_flag exists in a corresponding sequence and no sampling is performed in any macroblock in the sequence. If residue_sampling_flag is set to "1", mb_residue_sampling_flag indicating whether or not to perform sampling on a macroblock in a sequence exists. If residue_sampling_flag is set to "1" and mb_residue_sampling_flag in a macroblock is set to "1", it is determined to perform downsampling in the corresponding macroblock. If mb_residue_sampling_flag is set to "0", it is determined not to perform downsampling in the corresponding macroblock.

If it is determined to perform sampling, the residue image is downsampled at a predetermined ratio in operation 930. If sampling is performed, the downsampled data is encoded, and if sampling is not performed, residue data is encoded to generate a bitstream in operations 940 and 950.

The downsampled data is input to the transform/quantization unit 840 and transformed and quantized in operation 940, and then is input to the entropy encoding unit 850 and entropy encoded in operation 950.

Figure 10:
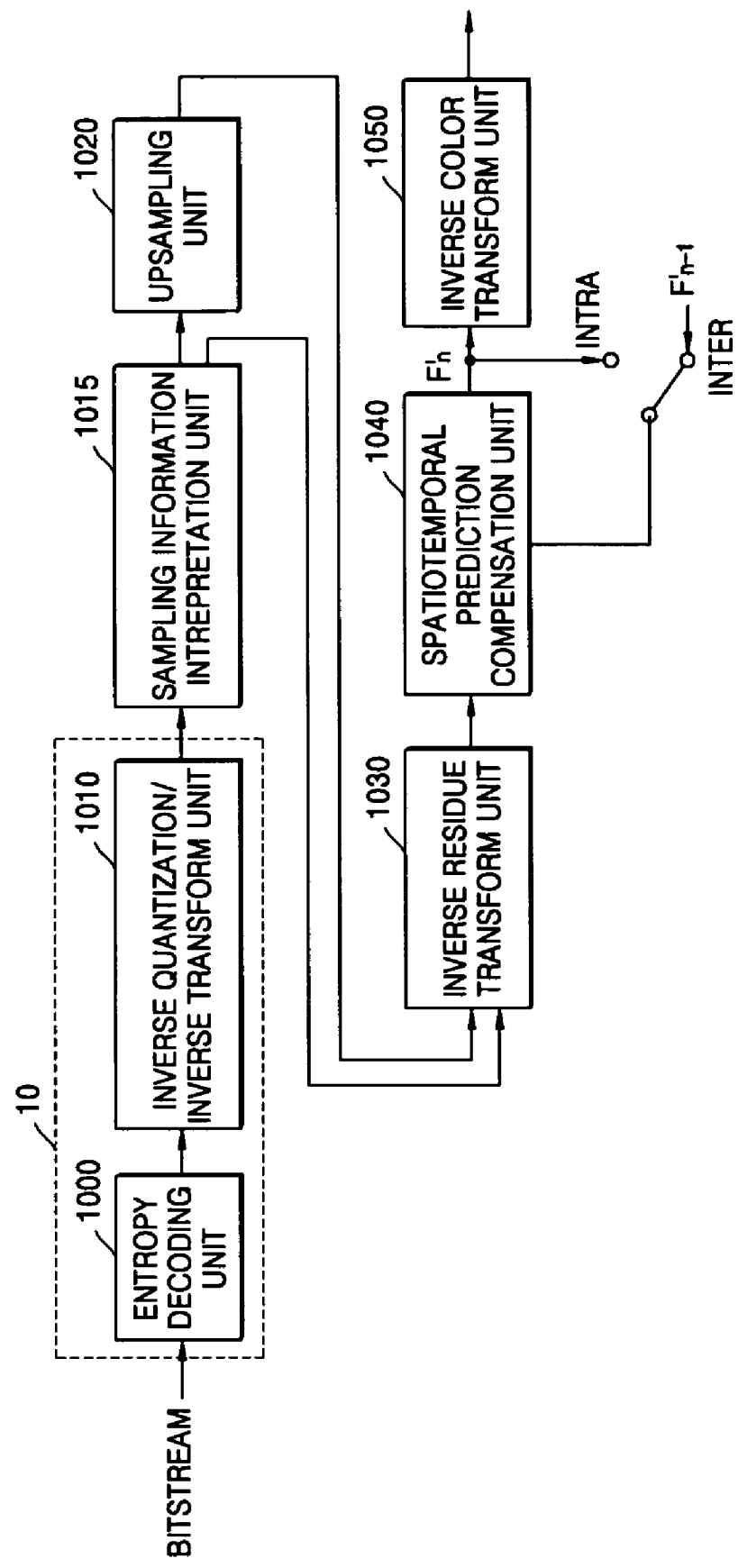
FIG. 10 is a block diagram of a preferred embodiment of an image decoding apparatus using residue upsampling according to the present invention.

Meanwhile, FIG. 10 is a block diagram of a preferred embodiment of an image decoding apparatus using residue upsampling according to the present invention. The image decoding apparatus using residue upsampling includes: a data restoration unit 10, a sampling information interpretation unit 1015, an upsampling unit 1020, an inverse residue transform unit 1030, a spatiotemporal prediction compensation unit 1040, and an inverse color transform unit 1050.

The data restoration unit 10 generates restored data by performing at least entropy decoding of a bitstream. Accordingly, when necessary, the data restoration unit 10 includes an entropy decoding unit 1000 and an inverse quantization/inverse transform unit 1010.

The entropy decoding unit 1000 performs entropy decoding of the bitstream. The inverse quantization/inverse transform unit 1010 performs inverse quantization and inverse transform of the entropy decoded data. In case of lossless encoding, the inverse quantization/inverse transform unit 1010 is not needed.

The image decoding apparatus using residue upsampling according to the present invention uses the upsampling apparatus of a residue image according to the present invention. Accordingly, since the structures of the upsampling unit 1020, the inverse residue transform unit 1030, the spatiotemporal prediction compensation unit 1040, and the inverse color transform unit 1050 are the same as those described above in the upsampling apparatus of a residue image, further explanation will be omitted here.

However, if sampling is performed selectively in relation to the size unit of image data when image data is encoded, the sampling information interpretation unit 1015 is needed.

At this time, the sampling information interpretation unit 1015 interprets whether the data restored in the data restoration unit 10 is downsampled data or not.

If the sampling information interpretation unit 1015 interprets that the data is downsampled data, the upsampling unit 1020 upsamples the downsampled data of the residue data. If the sampling information interpretation unit 1015 interprets that the data is not downsampled data, the spatiotemporal prediction compensation unit 1040 adds a predicted image to the data restored in the data restoration unit 10, and if the sampling information interpretation unit 1015 interprets that the data is downsampled data, adds the predicted image to the upsampled residue of each component so that the original image is restored.

When inverse residue transform is needed, if the sampling information interpretation unit 1015 interprets that the data is not downsampled data, the inverse residue transform unit 1030 performs inverse residue transform of the data restored in the data restoration unit 10, and if the sampling information interpretation unit 1015 interprets that the data is downsampled data, performs inverse residue transform of the upsampled data.

Then, the spatiotemporal prediction compensation unit 1040 restores the original image by adding a predicted image to the inverse residue transformed data.

Figure 11:
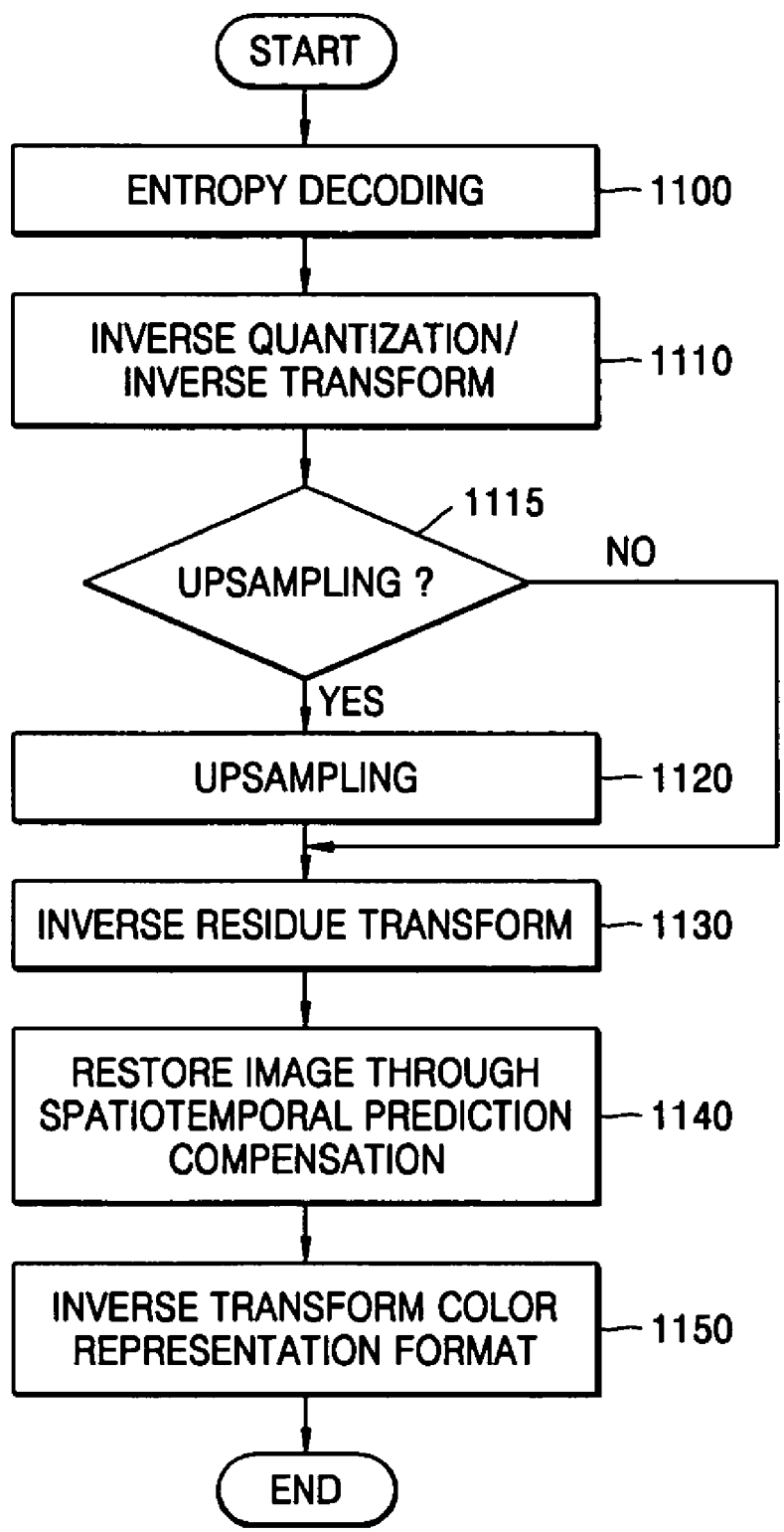
FIG. 11 is a flowchart of the operations performed by a preferred embodiment of an image decoding method using residue upsampling according to the present invention.

FIG. 11 is a flowchart of the operations performed by a preferred embodiment of an image decoding method using residue upsampling according to the present invention.

Referring to FIGS. 10 and 11, the image decoding method using residue upsampling and the operation of the apparatus will now be explained.

First, if input to the entropy decoding unit 1000, a bitstream of image data is entropy decoded in operation 1100. If the bitstream is lossy encoded data, the entropy decoded data is input to the inverse quantization/inverse transform unit 1010 and through inverse quantization and inverse transform, data is restored in operation 1110. If the bitstream is lossless encoded data, it does not go through a transform and quantization process when data is encoded.

The operations 1120 through 1150 shown in FIG. 11 are the same as in the upsampling method of a residue image described above.

Briefly explaining, image data restored to the downsampled data is upsampled by the upsampling unit 1020 in operation 1120, and inverse residue transformed by the inverse residue transform unit 1030 in operation 1130. Then, the image is restored by the spatiotemporal prediction compensation unit 1040 in operation 1140 and inverse color transformed by the inverse color transform unit 1050 in operation 1150.

However, if sampling is performed selectively in relation to size unit of image data when image data is encoded, sampling information interpretation is needed.

At this time, through the sampling information interpretation unit 1015, it is determined whether or not the data restored in the data restoration unit 10 is downsampled data in operation 1115.

If the sampling information interpretation unit 1015 interprets that the data is downsampled data, the downsampled data of the residue data is upsampled in operation 1120.

If the sampling information interpretation unit 1015 interprets that the data is not downsampled data, a predicted image is added to the data restored in the data restoration unit 10, and if the sampling information interpretation unit 1015 interprets that the data is downsampled data, the predicted image is added to the upsampled residue for each component in order to restore the original image in operation 1140.

When inverse residue transform is needed, if the sampling information interpretation unit 1015 interprets that the data is not downsampled data, the data restored in the data restoration unit 10 is inverse residue transformed, and if the sampling information interpretation unit 1015 interprets that the data is downsampled data, the upsampled data is inverse residue transformed in operation 1130.

Then, the original image is restored by adding a predicted image to the inverse residue transformed data through the spatiotemporal prediction compensation unit 1040 in operation 1150.

FIG. 12 illustrates that in the sampling apparatus and method of a residue image and the image encoding apparatus and method using the sampling apparatus and method according to the present invention described above, when prediction encoding is performed by the spatiotemporal prediction unit 410 and 810, in case of inter mode, temporal prediction is performed by dividing a macroblock into blocks with a predetermined size.

As shown in FIG. 12, a macroblock desired to be currently encoded is divided into blocks of a predetermined size and prediction is performed. The method is the one that is used in ISO/IEC 14496-10 and ITU-T Rec. H.264 standards technologies. In this method, basically, a macroblock with a size of 16×16 pixels is divided into a variety of sizes, including 16×16, 16×8, 8×16 and 8×8, and the motion vector of each divided block is obtained to predict an image value temporally. In particular, a block with an 8×8 size is again divided into 8×8, 8×4, 4×8, and 4×4 sizes such that file motions can be accurately sensed.

Figures 13A, 13B:
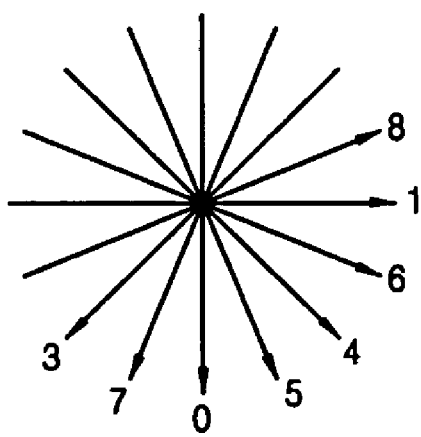
FIGS. 13A and 13B illustrate locations of neighboring pixels, locations of current block pixels and prediction directions for temporal prediction.

FIG. 13 illustrates a method for spatial prediction in case of intra mode when prediction encoding is performed. FIG. 13A shows locations of pixels of a current block and locations of adjacent pixels to be used for prediction. The method is the one that is used in ISO/IEC 14496-10 and ITU-T Rec. H.264 standards technologies. In FIG. 13A, in order to predict block data with a 4×4 size (pa, pb, . . . , pq), data previously encoded and restored and spatially adjacent (P0, P1, . . . , P12) are used. FIG. 13B illustrates 9 types of prediction directions 0 through 8 to predict a current block through projection from spatially adjacent pixels. For example, in case of direction 0, by projecting adjacent pixel values P1 through P4 in the vertical direction, pa, pe, pi and pm are predicted from P1 value, pb, pf, pj, and pn are predicted from P2 value, pc, pg, pk, and po are predicted from P3 value, and pd, ph, pl, and pq are predicted from P4 value. For other directions, pixels are predicted through projection in the same manner. In case of direction 2, DC prediction is performed. In this case, prediction is performed by using the average value of surrounding pixels.

This spatial and/or temporal prediction method is explained by using the conventional standard technology as an example, and other methods can also be used.

Meanwhile, after a residue image is generated, residue transform can be performed. The reason for performing the transform is to remove redundancy present between respective components. In particular, in case of an image that does not go through color transform, for example, in case of an RGB image, if this image is directly encoded, the encoding efficiency is lowered because there is information redundant between respective components. Accordingly, in order to remove redundant information between respective components, residue transform is performed.

If an input image is a color transformed image or a residue transformed image, when a residue image is sampled, the luminance component and the chrominance component can be separated as shown in FIG. 1B or 1C, and only the chrominance component can be sampled in a 1/2 or 1/4 ratio. At this time, as a method for sampling, there is a method using an average value by using adjacent pixels, and also a variety of filtering methods can be applied.

If an input image is not color transformed and not residue transformed, also through spatiotemporal prediction, a residue image can be generated and by sampling the residue image, the encoding efficiency can be enhanced. At this time, by considering visual importance of each component, a different sampling ratio may be applied.

Figure 14A:
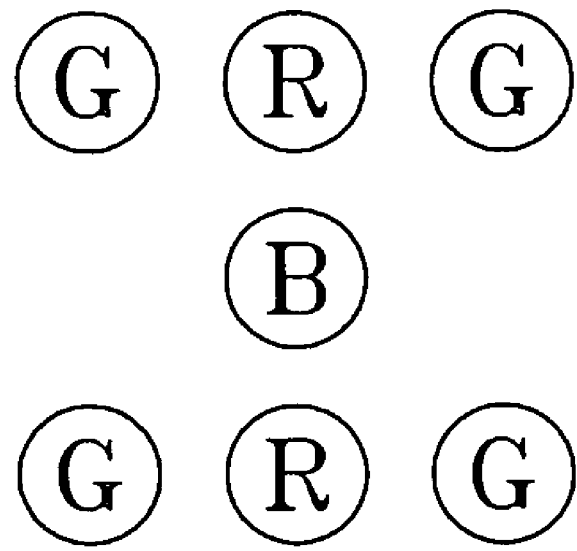
FIGS. 14A and 14B illustrate a chrominance sampling method.
Figure 14B:
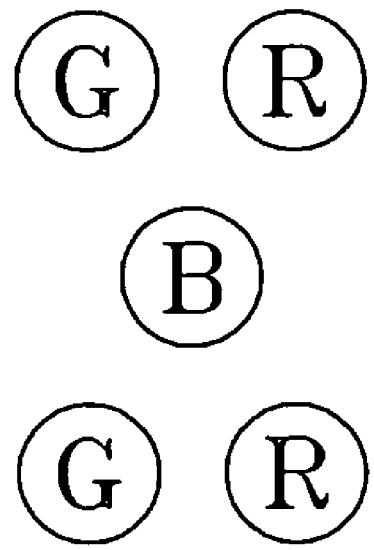

In particular, downsampling of an RGB color image can be performed. That is, visual importance of each component of the RGB color image is checked first, and on the basis of the visual importance, each component of the RGB color image can be downsampled at a different ratio. For example, as shown in FIG. 14A, if it is assumed that G, R, and B in an RGB image are in order of decreasing visual influence, from residues of each component, sampling can be performed by using 2 residue samples of R components and 1 residue sample of B component for each 4 residue samples of G components. Also, as shown in FIG. 14B, by using 1B component sample for each two G component samples and R component samples, sampling can be performed.

In addition, upsampling of the downsampled RGB color image can be performed. For this, first, the downsampled RGB color image is divided into R, G, and B components. Then, each component of the downsampled RGB color image is upsampled in a ratio corresponding to the downsampling.

Figure 15C:
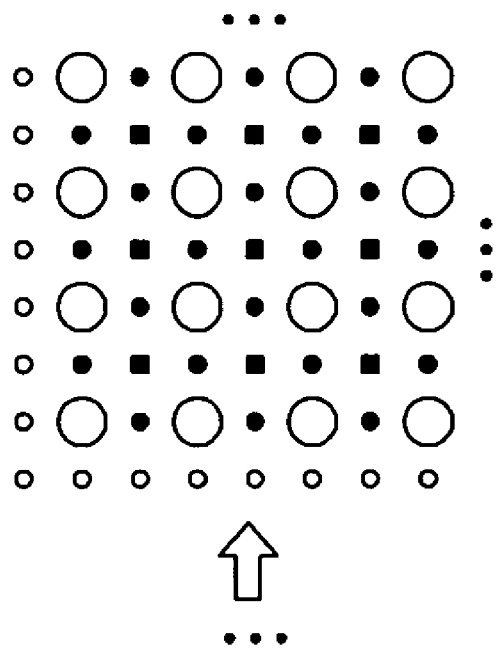
FIGS. 15A, 15B and 15C illustrate an upsampling process for upsampling image data using a current block.
Figure 15B:
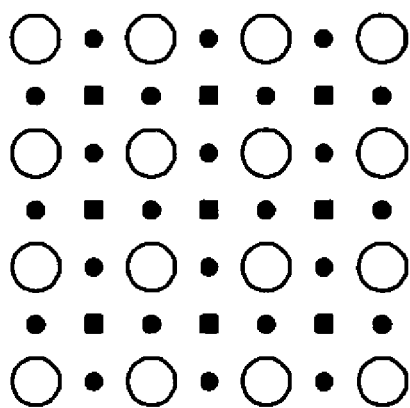
Figure 15A:
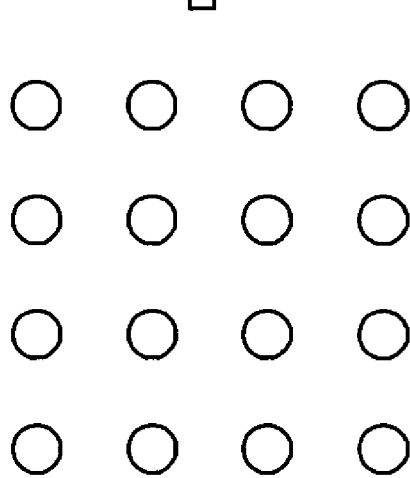

Meanwhile, a preferred embodiment of upsampling used in the upsampling method and apparatus of a residue image and the image data decoding method and apparatus using the upsampling method and apparatus according to the present invention will now be explained. FIGS. 15(A)-15(B) illustrate an upsampling process for upsampling image data using a current block.

Upsampling of image data can be performed in units of blocks with a predetermined size. Downsampled data as shown in FIG. 15A is upsampled through bi-linear interpolation as shown in FIG. 15B. However, for pixels on the left-hand side boundary and on the top boundary of a current block, the bi-linear interpolation should be performed by using adjacent block pixels. In FIG. 15C, however, adjacent block pixels are not used, and pixels of the current block are used to obtain values of pixels on the left-hand side boundary and top boundary of the current block.

For example, interpolation of pixels on the left-hand boundary of the current block can be performed by using right-hand side pixel values adjacent to the left-hand side pixels of the current block, and interpolation of pixels on the top boundary of the current block can be performed by using values of pixels adjacent to and below the top boundary pixels of the current block.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

According to the residue image down- and/or up-sampling method and apparatus and image encoding and/or decoding method and apparatus using the sampling method and apparatus according to the present invention, a residue image is obtained by performing spatiotemporal prediction encoding first, and by sampling this residue image, loss of information occurring in the sampling process can be reduced.

Also according to the present invention, since sampling is performed with a residue image obtained through a spatiotemporal prediction process, even when an original image that is not color transformed is directly encoded, sampling can be performed effectively. Also, the methods and apparatuses have an advantage that in addition to colors, sampling of any components can be performed effectively.

What is claimed is:

1. An image decoding method using residue sampling comprising:
    when in an original image formed with at least two image components, the difference between the original image and a predicted image is referred to as a residue, generating downsampled data of residues by performing at least entropy decoding from a bitstream;
    upsampling the downsampled data of the residues;
    performing inverse residue transform of the upsampled data by transforming the upsampled data using a relation between residues of respective image components; and
    restoring the original image by adding the predicted image to the upsampled residue of each component
    wherein at least one of the generating of the downsampled data of residues, upsampling of the downsampled data of the residues, performing of the inverse residue transform, and restoring of the original image is implemented by at least one processing device.

2. The method of claim 1, wherein the generating of downsampled data of residue data comprises:
    when in the original image formed with at least two image components, the difference between the original image and a predicted image is referred to as a residue, performing entropy decoding from a bitstream; and
    generating downsampled data of the residue data, by performing inverse quantization and inverse transform of the entropy encoded data.

3. The method of claim 2, wherein the restoring of the original image further comprises:
    inverse transforming the original image into a predetermined different color image expression format.

4. The method of claim 1, wherein the original image is one of an R-G-B format image, a Y-Cb-Cr format image, and an X-Y-Z format image.

5. The method of claim 1, wherein in case of intra mode, the predicted image for each component of the original image is obtained by estimating a prediction direction from a pixel spatially close to the pixel block of a current frame of each image component, and
    in case of inter mode, the predicted image is obtained by estimating a motion in units of blocks with a predetermined size between a current frame of each image component and the previous frame.

6. The method of claim 1, wherein the upsampling of data is performed in units of image data blocks with a predetermined size and for pixels on the left-hand side boundary and top boundary of a current block, the upsampling is performed by using pixel values of the current block.

7. The method of claim 1, wherein the restoring of the original image further comprises:
    inverse transforming the original image into a predetermined different color image expression format.

8. A computer readable medium having encoded thereon a computer program with executable instructions for the method of claim 1.

9. An image decoding method using residue sampling, the method comprising:
    restoring residue data by performing at least entropy decoding from a bitstream when in an original image formed with at least two image components, the difference between the original image and a predicted image being referred to as a residue;
    determining whether or not the residue data is downsampled residue data; if the residue data is downsampled residue data, performing upsampling of the residue data; and
    restoring the original image, the restoring comprising
    adding a predicted image to the residue data if the residue data is not downsampled data,
    adding the predicted image to the upsampled data if the residue data is downsampled data,
    if the residue data is not downsampled data, performing inverse residue transform of the residue data,
    if the data is downsampled data, performing inverse residue transform of the upsampled data, and
    restoring the original image by adding the predicted image to the inverse residue transformed data,
    wherein at least one of the restoring of the residue data by performing at least entropy decoding, determining of whether or not the residue data is downsampled residue data, performing upsampling of the residue data, and restoring the original image is implemented by at least one processing device.

10. A computer readable medium having encoded thereon a computer program with executable instructions for the method of claim 9.

11. The method of claim 9, wherein the inverse residue transform uses a relation between residues of respective image components.

12. An image decoding apparatus using residue sampling comprising:
    a data restoration unit generating downsampled data of residues by performing at least entropy decoding from a bitstream when in an original image formed with at least two image components, the difference between the original image and a predicted image is referred to as a residue;
    an upsampling unit upsampling downsampled data of the residue data; and
    an inverse residue transform unit performing inverse residue transform of the upsampled data by transforming at least one of the residues using a relation between residues of respective image components;

a spatiotemporal prediction compensation unit restoring the original image by adding the predicted image to the upsampled residue of each component.

13. The apparatus of claim 12, wherein the data restoration unit comprises:

an entropy decoding unit performing entropy decoding from a bitstream when in an original image formed with at least two image components, the difference between the original image and a predicted image is referred to as a residue; and an inverse quantization/inverse transform unit generating downsampled data of residue data, by performing inverse quantization and inverse transform of the entropy decoded data.

14. The apparatus of claim 13, further comprising an inverse color transform unit performing inverse color transform of the image restored in the spatiotemporal prediction compensation unit into a predetermined different color image expression format.

15. The apparatus of claim 12, wherein the original image is one of an R-G-B format image, a Y-Cb-Cr format image, and an X-Y-Z format image.

16. The apparatus of claim 12, wherein in case of intra mode, the predicted image for each component of the original image is obtained by estimating a prediction direction from a pixel spatially close to the pixel block of a current frame of each image component, and in case of inter mode, the predicted image is obtained by estimating a motion in units of blocks with a predetermined size between a current frame of each image component and the previous frame.

17. The apparatus of claim 12, wherein the upsampling of the upsampling unit is performed in units of image data blocks with a predetermined size and for pixels on the left-hand side boundary and top boundary of a current block, upsampling is performed by using pixel values of the current block.

18. The apparatus of claim 12, further comprising an inverse color transform unit performing inverse color transform of the image restored in the spatiotemporal prediction compensation unit into a predetermined different color image expression format.

19. An image decoding apparatus using residue sampling comprising:

a data restoration unit performing at least entropy decoding to restore residue data from a bitstream when in an original image formed with at least two image components, the difference between the original image and a predicted image is referred to as a residue;

a sampling information interpretation unit interpreting whether or not residue data restored in the data restoration unit is downsampled data;

an upsampling unit performing upsampling of downsampled data of the residue data;

a spatiotemporal prediction compensation unit restoring the original image by adding a predicted image to the residue data restored in the data restoration unit if the sampling information interpretation unit interprets that the data is not downsampled data, and by adding the predicted image to the upsampled residue of each component if the sampling information interpretation unit interprets that the data is downsampled data; and an inverse residue transform unit performing inverse residue transform of the data restored in the data restoration unit, if the sampling information interpretation unit interprets that the data is not downsampled data, and if the sampling information interpretation interprets that the data is downsampled data, performing inverse residue transform of the upsampled data, wherein the spatiotemporal prediction compensation unit restores the original image by adding the predicted image to the inverse residue transformed data.

20. The apparatus of claim 19, wherein the inverse residue transform uses a relation between residues of respective image components.

* * * * *